United States Patent

Cataffo et al.

[11] 4,086,113
[45] Apr. 25, 1978

[54] METHOD AND MEANS FOR REPAIRING DAMAGED VINYL SHEETS

[76] Inventors: Herman R. Cataffo, 21 St. James Pl., Brooklyn, N.Y. 11205; Anthony J. De Meo, 2072 E. 17th St., Brooklyn, N.Y. 11229

[21] Appl. No.: 713,341

[22] Filed: Aug. 11, 1976

[51] Int. Cl.² ............................................. B32B 35/00
[52] U.S. Cl. ........................................ 156/98; 264/36; 427/140; 428/63
[58] Field of Search ................... 156/94, 98; 428/63; 427/140; 264/36

[56] References Cited

U.S. PATENT DOCUMENTS

| 1,113,030 | 10/1914 | McLaurin | 428/63 |
|---|---|---|---|
| 2,116,008 | 5/1938 | Block | 156/94 |
| 2,293,374 | 8/1942 | Wesseler | 156/94 |
| 2,624,689 | 1/1953 | Peters et al. | 156/94 |
| 2,943,969 | 7/1960 | Boyer et al. | 156/94 |
| 3,083,597 | 4/1963 | Best | 156/94 |
| 3,271,217 | 9/1966 | Mapson | 156/98 |
| 3,772,114 | 11/1973 | Kowalchuk | 156/98 |

*Primary Examiner*—Edward G. Whitby
*Attorney, Agent, or Firm*—William P. Keegan

[57] ABSTRACT

A preformed, pre-cured, reenforced plastisol patch is provided for repairing damaged vinyl sheets. The damaged portion of a sheet is removed and a patch, which has an area greater than that of the removed portion of the sheet so as to overlap the undamaged material surrounding the opening left by the removed portion, is placed over the opening and is fused to the surrounding undamaged sheet.

6 Claims, 12 Drawing Figures

METHOD AND MEANS FOR REPAIRING DAMAGED VINYL SHEETS

FIELD OF THE INVENTION

This invention relates to a method and a means for repairing vinyl or other like sheet material that has been torn, burned, or otherwise damaged. Such material may be used, for example, to cover furniture of all types, and for automobile roof coverings and seats.

BACKGROUND OF THE INVENTION

It is presently the practice in repairing damaged vinyl or plastic upholstered articles to remove the damaged portion from the article so as to leave an opening having a clean cut perimeter. Thereafter, a piece of backing cloth is placed underneath the opening so as to provide a support surface for the vinyl repair compound that is used in effecting the repair. The repair compound is in the form of a paste that is trowelled into the opening and smoothed level with the surrounding undamaged material. In order to cure or solidify the compound and join it to the surrounding material heat is applied to the repair compound usually by a hot air blower similar to a portable hair dryer. Often the paste compound must be applied in thin layers that are cured one at a time before the next layer of paste is trowelled into the repair area. Either a vinyl release paper having a surface texture to match the surface texture of the surrounding undamaged vinyl sheet or a silicone or plastic mold that was cast on the undamaged vinyl sheet so as to have the text thereof impressed on its surface is pressed against the repaired area before the paste is completely cured to emboss a surface texture on the repaired area that matches the surrounding vinyl sheet. When the repaired area is cured, the release paper or mold is stripped therefrom.

While the use of a heat cured compound is most prevalent, air cured compounds which do not require the application of heat are available. If such a compound is used, the release paper is laid over the soft paste and pressure is applied to the paper to obtain the desired surface texture on the repaired area. After the repair compound was cured, the release paper is stripped from the material leaving a repair that matches the surrounding material.

The foregoing repair techniques are, so far as is known, the only ones followed in effecting repairs to vinyl sheets or furniture coverings, and are reasonably satisfactory. However, they are beset by certain shortcomings or disadvantages. In the first place, working with the paste compounds is relatively messy. Secondly, such techniques lend themselves particularly to the repair of relatively small damaged areas because it is difficult to trowel a paste compound into an opening having a large surface area even though a backing cloth is used. It is also difficult to maintain a uniform thickness in a large area repair. Also, and most importantly, it has been found that in any but the smallest repairs, a paste compound does not achieve sufficient structural strength to provide a long lasting repair.

BRIEF DESCRIPTION OF THE INVENTION

Accordingly, it is the object of the present invention to provide an improved method and means for effecting repairs to vinyl sheets and furniture coverings.

It is a further object of the invention to accomplish such repairs without the use of paste compounds.

In carrying out the invention, a preformed, pre-cured reenforced plastisol patch is provided for repairing a damaged section of vinyl material. The patch overlaps the material surrounding the damaged area and is fused thereto by the application of heat which sufficiently softens the plastisol of the patch and the vinyl sheet material to permit the two to merge into a seamless sheet with the patch reenforcing material overlapping the undamaged part of the vinyl sheet. A release paper or silicone mold may be used to obtain a uniform surface appearance between the patch and the vinyl sheet.

A feature of the invention is that the preformed, pre-cured reenforced patches can be furnished in a wide variety of sizes and shapes to a vinyl repair technician thus enabling repairs to be made expeditiously and conveniently to the great majority of burns, tears, or similar type damage, encountered in vinyl furniture coverings.

Other features and advantages of the invention may be gained from the foregoing and from the description of a preferred embodiment thereof which follows:

DETAILED DESCRIPTION OF THE INVENTION

Figures 1, 2:
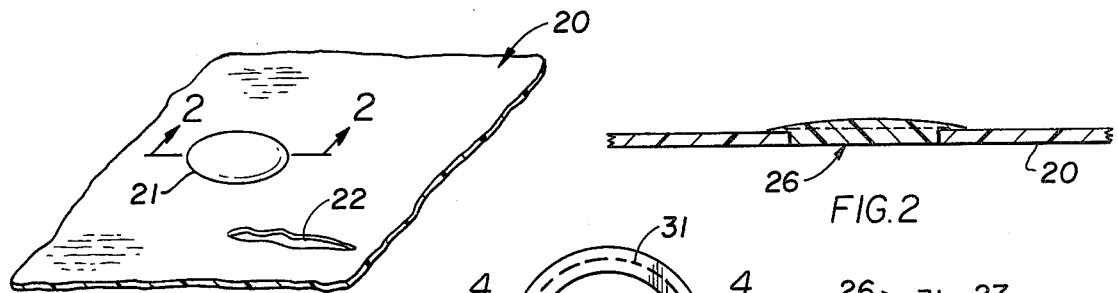
FIG. 1 is a perspective view of a piece of vinyl sheeting having damaged areas to be repaired.
FIG. 2 is a sectional view taken along line 2—2 of FIG. 1 showing a preformed, pre-cured, reenforced patch repairing a damaged area according to the present invention.

In FIG. 1 a fragment of vinyl sheeting 20 is shown having two damaged areas, a cigarette burn 21 and a jagged tear 22. Sheeting 20 may be used for furniture covering, automobile vinyl roof covering, or any other application for which vinyl sheet material may be suitable.

Figures 9, 10:
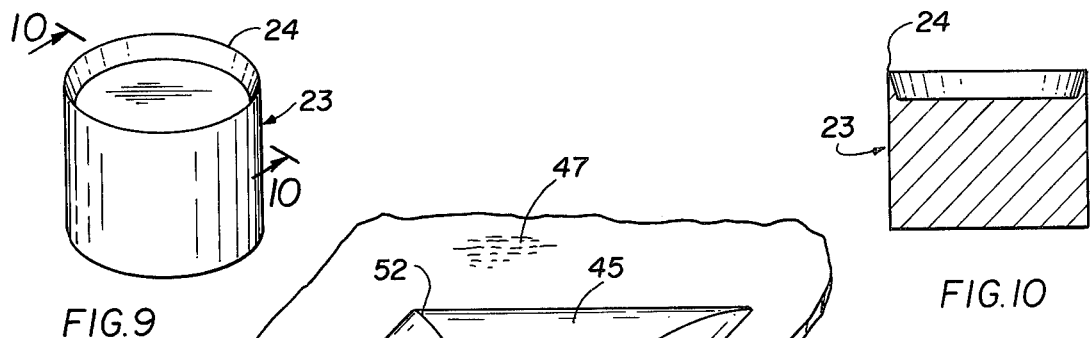
FIG. 9 is a perspective view of a tool suitable for cutting a damaged area from a vinyl sheet.
FIG. 10 is a sectional view taken along line 10—10 of FIG. 9.

According to the present invention, the damaged area, for example cigarette burn 21, is first excised from the vinyl sheet. This is accomplished by a cutting tool 23 (see FIGS. 9 and 10) having a circular blade 24 formed at one end of a cylinder 25. Several cutting tools of different diameters can be provided so that damaged areas of differing sizes can be excised conveniently. To remove the damaged area 21 from vinyl sheet 20, tool 23 will be placed against the sheet. By rotating the tool while applying a slight downward pressure, the damaged area of the sheet will be removed leaving a circular hole or opening with a sharply defined perimeter in the sheet.

Figures 3, 4:
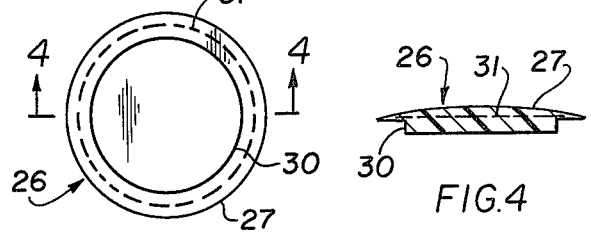
FIG. 3 is a bottom plan view of the vinyl patch shown in FIG. 2.
FIG. 4 is a sectional view taken along line 4—4 of FIG. 3.

A preformed, pre-cured, reenforced plastisol patch 26 (FIGS. 3 and 4) is then inserted in the circular opening thus provided in sheet 20 as shown in FIG. 2. Patch 26 comprises a circular cover portion 27 having a diameter larger than that of the hole or opening cut in sheet 20 and a stem portion 30 having a diameter approximately 0.005 inches greater than that of the opening and a length or depth approximately equal to the thickness of the vinyl sheet being repaired. Embedded in cover portion 27 of patch 26 is a layer of reenforcing material 31. This reenforcing layer which lends tensile strength to the patch and which integrates the patch into the surrounding undamaged material of sheet 20 may be of any suitable material such, for example, as linen, cotton muslin, a synthetic fiber cloth, or even a porous paper. The area of the reenforcing material 31 also will be greater than the opening cut in sheet 20 so that it too overlaps the surrounding undamaged material when the patch is placed in the opening. It will be observed, especially in FIGS. 2 and 4, that the edge of the cover portion 27 is feathered to a very thin edge. It should be noted that for purposes of illustration the drawing shows patch 26 with considerable thickness whereas in actual construction the entire patch is quite thin and is comparable to the thickness of the vinyl sheet being repaired. The cover portion 27 is itself very thin, being just thick enough to embed the reenforcing cloth 31 in the plastisol coating.

It will be appreciated at this point that a variety of patches 26, each having a different diameter stem portion (and correspondingly different diameter cover portion) could be provided for effecting repairs of different diameter openings in sheet 20. Of couse, a like number of cutting tools 23 would be provided so that each size patch 26 would be used in an opening cut by a correspondingly sized cutting tool. Also, the length of the stem portion of patches could be varied between different patches to facilitate the repair of vinyl sheets of different thicknesses. The length of the stem portion of a patch should correspond approximately to the thickness of the vinyl sheet being repaired to avoid a dimpled appearance in the repaired sheet. The cover portion of the various patches will be essentially the same in thickness since its function is to embed the reenforcing layer of the patch into the vinyl surrounding the opening cut in the sheet under repair.

Returning again to the description of FIG. 2, after patch 26 is in place in the opening cut in sheet 20 with the cover portion 27 overlapping the undamaged material adjacent the opening, heat is applied to the patch and to the immediate surrounding area of sheet 20. A temperature of 375 to 400° F, preferably about 390° F has been found effective in fusing patch 26 into sheet 20. Heat may be applied either by a hot air blower or by an ironing tool having a sole plate that applies heat and pressure to the patch. With the latter type appliance, the cover portion 27 of the patch can be fused into the surface of the undamaged part of sheet 20 with the application of less heat since the softened plastisol of the patch and the softened vinyl of sheet 20 can be pressed together to form a seamless repair. Without the application of pressure, the plastisol of the patch has to melt into the vinyl sheet and so may require a longer period of application of heat or a higher temperature. Scorching of patch 26 and sheet 20 can be obviated by avoiding the prolonged application of heat to one area as by continuously moving the heat source over the area under repair. A release paper may be placed over patch 26 so that heat and pressure are applied through the paper to provide a surface texture to the patch that matches that of sheet 20.

While patch 26 could be pre-colored and provided in a number of commonly used colors, in the absence of standardized colors it is preferable to have the technician making the vinyl repair match the patch to the surrounding sheet by the application of a vinyl lacquer in spray form.

Figures 5, 6:
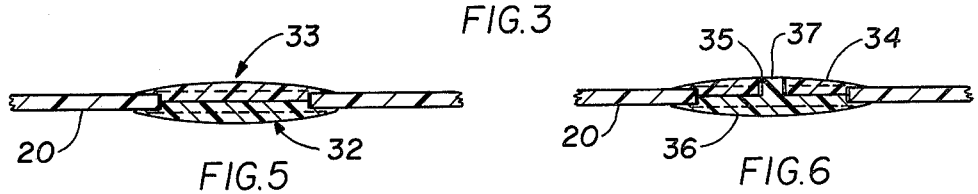
FIG. 5 is a sectional view similar to FIG. 2 showing patches used for repairing thicker vinyl material.
FIG. 6 is a view similar to FIG. 5 but showing a modified patch for repairing thicker vinyl material.
Figures 7, 8:
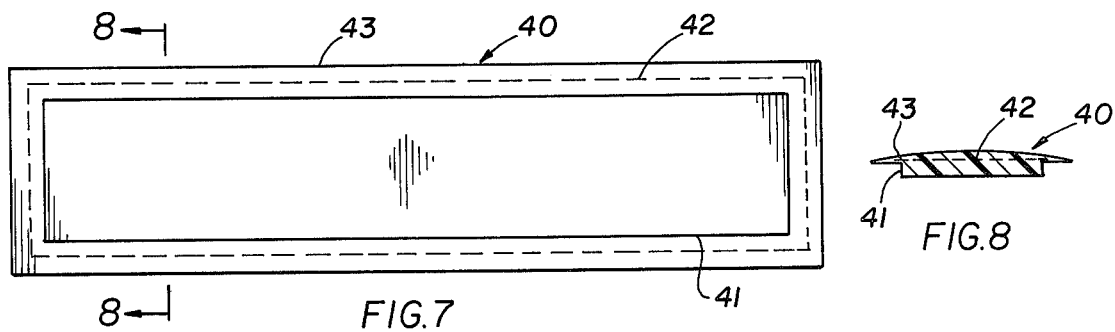
FIG. 7 is a bottom plan view of a preformed, pre-cured reenforced patch of a different configuration.
FIG. 8 is a sectional view taken along line 8—8 of FIG. 7.

As an alternate to the use of patches 26 having stem portions of greater length for repairing thicker vinyl sheets, the arrangement shown in FIG. 5 can be used. In this embodiment, two patches 32 and 33 are inserted in the opening cut in sheet 20, one from each side of the sheet. Thin layers of pre-cured sheeting could be used between the stem portions of patches 32 and 33 to build up the thickness of the patch, if necessary. The application of heat to fuse the two patches into the surrounding material will be for a period of time longer than that required for repairing thinner material since the heat must be transmitted through the thicker sheet material. A further modification can be made as shown in FIG. 8. Here the upper patch 34, i.e., the patch to which heat is applied directly or through a release paper, is provided with a central aperture 35. The lower patch 36 is provided with a rivetlike member 37 projecting from the stem portion of the patch. With such an arrangement, when heat is applied to patch 34, member 37 will be fused to patch 34 and the cover portion of patch 34 and its reenforcing cloth into sheet 20. Thus, even if the period of heat application is not long enough to fuse the cover portion of patch 36 to the underside of sheet 20, a satisfactory repair will have been made because of the joining of member 37 to patch 34. The patches 34 and 36 will in all other respects resemble patch 26. That is, the cover portion of patches 34 and 36 will be provided with an embedded reenforcing cloth, and the edges of the cover portion will be feathered.

FIG. 7 shows a preformed, pre-cured reenforced patch 40 that would be suitable for repairing a long tear such as tear 22 shown in FIG. 1. For such a patch, a rectangular opening would be cut in sheet 20 slightly smaller than the dimensions of the insert portion 41 of the patch. The opening in sheet 20 could be made by a suitable tool, somewhat like tool 23 but, of course, rectangular in shape, or by the use of a suitably sized template and a knife or razor blade. A reenforcing cloth 42 is embedded in the cover portion 43 of the patch and the edges of the cover portion are feathered as shown in FIG. 8. When placed in a rectangular opening in sheet 20, patch 40 is fused into the sheet by the application of heat as hereinabove described. The surface texture of patch 40 can be matched to the undamaged surface of sheet 20 by applying the heat through release paper having the same grain pattern as that of sheet 20 or by the use of a silicone mold.

Figures 11, 12:
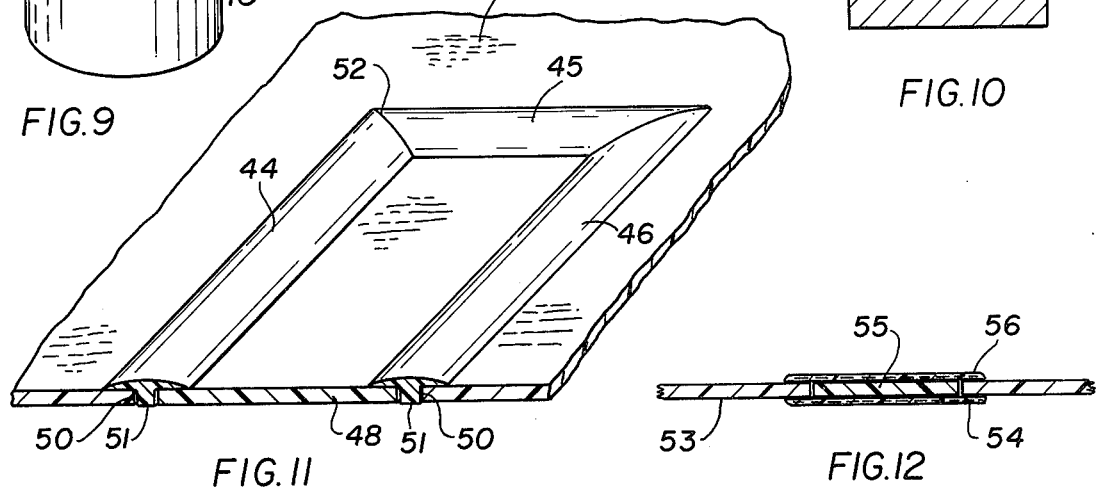
FIG. 11 is a perspective view showing the use of vinyl strips similar to those shown in FIG. 7 for repairing large areas of a vinyl sheet.
FIG. 12 is a sectional view showing another way of repairing damage to vinyl material using thin layers of pre-cured reenforced plastisol sheets.

Exceptionally large areas of damaged vinyl sheeting can be repaired as shown in FIG. 11. Here, preformed, pre-cured reenforced patching strips 44, 45, and 46 can be placed overlapping original sheet 47 and an insert 48 that can be cut fom an unused hidden portion of the original sheet 47. The insert 48 will be dimensioned somewhat less than the opening 50 provided in sheet 47 so that the insert portion 51 of strips 44, 45, and 46 can be inserted between the edges of opening 50 and insert 48. The insert portion 51 can be relatively narrow since insert 48 can be sized to fit opening 50 quite accurately. It would be acceptable if the insert portion 51 is omitted entirely and insert 48 sized to fit snugly into the opening cut in sheet 47. The strips 44, 45, and 46 can be cut to the desired length from a roll of preformed, pre-cured, reenforced strip material having the preferred cross section. Where patching strips intersect, as at corner 52, the ends of the strips can be mitered where they are joined. The strips 44, 45, and 46, or the roll from which they are cut, are provided with reenforcing cloth as in patch 40 and the longitudinal edges of the patching strips are feathered as illustrated in FIG. 11. The strips are fused into sheet 47 and insert 48 by the application of heat to the strips and the areas immediately adjacent the strips as previously described.

A further modification of the invention is illustrated in FIG. 12. Here the patch is formed of one or more layers of precured plastisol having a reenforcing cloth embedded therein. The thin sheets, which are comparable in thickness to the cover portion 27 of patch 26, may be provided in a number of predetermined sizes, or it may be provided in a large size sheet from which a vinyl repair technician can cut the size desired for the repair being made. Thus a number of sheets 54 and 56 can be laid over an opening in sheet 53 and heat applied to fuse sheets 54 and 56 into each other and into vinyl sheet 53. A plastisol filler piece 55 may be used if sheet 53 is relatively thick compared to sheets 54 and 56. This embodiment of the invention is particularly applicable for repairing damages where a part of the sheet being repaired does not have to be cut out of the sheet as in the case of a slash or cut in the vinyl sheeting. Also, it is suitable for repairing thin, unexpanded vinyl sheeting even when the damaged area requires that an opening be cut as in FIG. 12. In such a case, filler piece 55 would not be used and a single 54 or 56, either below or above the surface of sheet 53, may be satisfactory. It has been found in certain situations that a less noticeable repair, disregarding a color difference between the patch and the sheet 53, has been obtained with the patching sheet, e.g., 54, placed on the underside of sheet 53.

It will be appreciated from what has been described that in accordance with the present invention a vinyl repair technician can be provided with a kit containing a variety of preformed, pre-cured, reenforced plastisol patches that will enable him to make almost any vinyl repair quickly and conveniently without having to work with paste materials. The patches are preformed, precured reenforced plastisols that are readily fused into vinyl sheeting by the application of heat at a temperature of approximately 390° F. Release papers are used to match the surface texture of the patch to that of the vinyl sheeting under repair. After a repair has been made, a vinyl lacquer can be applied to color match the patch to the undamaged sheeting.

Having thus described the invention, it is clear that many apparently different embodiments thereof can be conceived that would not depart from the spirit and scope of the invention, and therefore the foregoing description and the accompanying drawing are to be interpreted in an illustrative sense rather than in a limiting sense.

What is claimed is:

1. The method of repairing tears, burns, or like damage in vinyl or similar thermoplastic material which comprises the steps of providing a pre-cured thermoplastic patch having a heat softening property comparable to that of the material being repaired and comprising a stem portion for insertion into a void in the material to be repaired and a cover portion having a layer of backing cloth embedded therein for overlapping the undamaged material surrounding the void, excising the damaged area of the material to be repaired to provide a void having a cross sectional area corresponding to the cross sectional area of the stem portion of the pre-cured thermoplastic patch but less than that of said cover portion and the layer of backing cloth embedded therein, inserting the stem portion of the patch into the void provided in the material under repair with the cover portion of the patch and the layer of backing cloth embedded therein overlapping the undamaged material surrounding the void, and applying heat to the cover portion of the patch and the material being repaired to fuse the cover portion and the embedded layer of backing cloth into the material being repaired.

2. The method according to claim 1 wherein the void provided in the material being repaired is made smaller in cross sectional area than the cross sectional area of the stem portion of the patch that is inserted in the void.

3. The method according to claim 1 including the step of applying pressure to the patch when heat is being applied whereby the fusion of the patch into the material being repaired is facilitated.

4. The method of repairing tears, burns, or like damage in vinyl or similar thermoplastic material which comprises the steps of providing a pre-cured thermoplastic patch having a heat softening property comparable to that of the material being repaired and a layer of backing cloth embedded therein, placing the patch over the damaged area to be repaired so that the layer of backing cloth covers the damaged area and overlaps the surrounding undamaged area, and applying heat to said patch and to the material it overlaps to soften both the patch and the material overlapped to cause said patch to fuse into the material being repaired.

5. The method according to claim 4 including the step of applying pressure to the patch when heat is being applied whereby the fusion of the patch into the material being repaired is facilitated.

6. The method of repairing tears, burns, or like damage in vinyl or similar thermoplastic material which comprises the steps of providing a pre-cured thermoplastic patch having a heat softening property comparable to that of the material being repaired, placing the patch over the damaged area so that it covers the damaged area and overlaps the surrounding undamaged material, and applying heat to said patch and to the material it overlaps to soften both the patch and the overlapped material to cause said patch to fuse into the material being repaired.

* * * * *